United States Patent
Murray et al.

(10) Patent No.: US 11,787,902 B2
(45) Date of Patent: Oct. 17, 2023

(54) CONTINOUS PROCESS FOR PRODUCING POLYOL MODIFIED POLYALKENYLENE TEREPHTHALATE

(71) Applicants: ELANTAS PDG INC., St. Louis, MO (US); ALTANA AG, Wesel (DE)

(72) Inventors: Thomas James Murray, Chesterfield, MO (US); Aditya Baradwaj, St. Louis, MO (US); James Herbison, St. Louis, MO (US); Bjorn Askevold, Düsseldorf (DE)

(73) Assignees: ELANTAS PDG INC., St Louis, MO (US); ALTANA AG, Wesel (DE)

( * ) Notice: Subject to any disclaimer, the term of this patent is extended or adjusted under 35 U.S.C. 154(b) by 513 days.

(21) Appl. No.: 17/058,697

(22) PCT Filed: May 31, 2019

(86) PCT No.: PCT/EP2019/064189
§ 371 (c)(1),
(2) Date: Nov. 25, 2020

(87) PCT Pub. No.: WO2019/229237
PCT Pub. Date: Dec. 5, 2019

(65) Prior Publication Data
US 2021/0179775 A1 Jun. 17, 2021

(30) Foreign Application Priority Data

Jun. 1, 2018 (EP) ..................... 18175592

(51) Int. Cl.
| | |
|---|---|
| *C08G 63/91* | (2006.01) |
| *C08F 283/02* | (2006.01) |
| *C09D 167/02* | (2006.01) |
| *C09D 175/06* | (2006.01) |
| *H01B 3/42* | (2006.01) |
| *H01B 13/06* | (2006.01) |

(52) U.S. Cl.
CPC .......... *C08G 63/916* (2013.01); *C08F 283/02* (2013.01); *C09D 167/02* (2013.01); *C09D 175/06* (2013.01); *H01B 3/421* (2013.01); *H01B 13/06* (2013.01)

(58) Field of Classification Search
CPC .................................................. C08G 63/916
See application file for complete search history.

(56) References Cited

U.S. PATENT DOCUMENTS

| | | | |
|---|---|---|---|
| 3,249,578 A | 5/1966 | Meyer et al. | |
| 3,342,780 A | 9/1967 | Meyer et al. | |
| 3,699,082 A | 10/1972 | Koerner et al. | |
| 4,186,257 A * | 1/1980 | Blahak ............... | C08G 18/4615 528/84 |
| 4,446,300 A | 5/1984 | Mabrey et al. | |
| 4,476,279 A | 10/1984 | McGregor et al. | |
| 4,849,465 A | 7/1989 | Lindvay et al. | |
| 4,873,268 A * | 10/1989 | Hallmark ........... | C08G 18/4213 521/48.5 |
| 2017/0121456 A1 | 5/2017 | Bae et al. | |

FOREIGN PATENT DOCUMENTS

| | | |
|---|---|---|
| EP | 0691370 A2 | 1/1996 |
| JP | H10245178 | 9/1998 |
| JP | 2915563 B2 | 7/1999 |
| JP | 2004307779 | 11/2004 |
| WO | 9833837 A1 | 8/1998 |

OTHER PUBLICATIONS

International Search Report and Written Opinion for International Patent Application No. PCT/EP2019/064189 dated Oct. 1, 2019 (26 pages).
Z. Guo et al., "An efficient recycling process of glycolysis of PET in the presence of a sustainable nanocatalyst," Journal of Applied Polymer Science, 2018, pp. 46285-46285.
S. Inoue et al., Theic Decomp, vol. 54, No. 6. (Jun. 1997), pp. 407-411.

* cited by examiner

*Primary Examiner* — Andrew T Piziali
(74) *Attorney, Agent, or Firm* — Fitch, Even, Tabin & Flannery, LLP

(57) ABSTRACT

The present invention relates to a continuous process for the production of polyol modified polyalkenylene terephthalates and the application of such polyol modified polyalkylene therephtalate on wire enamels.

16 Claims, No Drawings

CONTINOUS PROCESS FOR PRODUCING POLYOL MODIFIED POLYALKENYLENE TEREPHTHALATE

The present invention relates to a continuous process for the production of polyol modified polyalkenylene terephthalate.

BACKGROUND OF THE INVENTION

Polyol modified polyalkylene terephthalate are well established materials used in the production of wire enamels and especially tris(2-hydroxyethyl)isocyanurate containing polyesters have been widely used as magnet wire coatings.

Polyol modified polyalkylene terephthalate can be produced via polycondenstation of the corresponding monomers or via transesterification of polyesters, usually in batch reactors as described e.g. in U.S. Pat. No. 4,849,465. The disadvantages of this process are that working with batch reactors it is time consuming and monomers as well as the resulting polymer must be dissolved in a solvent, usually cresylic solvents.

Cresylic solvents are classified as hazardous to the environment. When polyol modified polyalkylene terephthalates are produced via polycondenstation water is formed as reaction product. The disposal of such water is expensive because it is contaminated by the solvent.

Thus, for the production of polyol modified polyalkylene terephthalate on an industrial scale, there is still the need of a time and costs efficient process, which greatly reduces or does not involve the use of a solvent.

These problems are solved by the process of the invention.

The present invention relates to a continuous process for producing a polyol modified polyalkyleneterephthalate comprising the steps of:
  (a) introducing in a continuous reactor comprising a reaction zone i) a polyalkylene terephthalate, ii) a polyol and iii) a transesterification catalyst and one or more optional components;
  (b) reacting the introduced components in the reaction zone of the reactor at a temperature in the range of 180° C. to 350° C. to produce a polyol modified polyalkylene terephthalate;
wherein the polyol ii) of step a) is selected from tris(2-hydroxyethyl)isocyanurate and glycerine, optionally further comprising a second polyol and wherein step b) is performed in a melt of the polyalkylene terephthalate i).

The process of the invention is performed in a continuous reactor. Preferably the process of the invention is performed in an extruder. In an extruder, high temperatures can be reached and this allows the handling of polyalkylene therepthalate and its high viscosity in the melt phase. Conventional batch reactors cannot handle the high temperatures or agitation needed to melt polyalkylene terephthalate without the use of solvents.

Accordingly, the process of the invention can be performed in a melt of the polyalkenylene terephthalate resulting in a greatly reduced use of a solvent to a process which can be performed without solvent.

According to the invention, melt of polyalkylene terephthalate optionally comprises one or more solvents, wherein the amount of solvent in the melt is lower than 20% by weight with respect to the polyalkylene terephthalate charged in step a), more preferably in an amount lower than 15% by weight, more preferably in an amount lower than 10% by weight, more preferably in an amount lower than 5% by weight, more preferably in an amount lower than 3% by weight more preferably in an amount lower than 2% by weight, more preferably in an amount lower than 1% by weight.

In a preferred embodiment of the process of the invention, step b) is performed in the melt of the polyalkylene terephthalate, wherein the melt of the polyalkylene terephthalate is substantially free of a solvent.

Substantially free of solvent, low or reduced amount of solvent mean that the solvent is preferably in an amount lower than 20% by weight with respect to the polyalkylene terephthalate charged in step a), more preferably in an amount lower than 15% by weight, more preferably in an amount lower than 10% by weight, more preferably in an amount lower than 5% by weight, more preferably in an amount lower than 3% by weight more preferably in an amount lower than 2% by weight, more preferably in an amount lower than 1% by weight.

In a further preferred embodiment of the process of the invention step b) is performed in the melt of polyalkylene terephthalate in the absence of a solvent.

In a preferred embodiment of the process of the invention, the polyalkylene terephthalate is polyethylene terephthalate or polybutylene terephthalate.

In the process of the invention, polyols are used to modify polyalkylene terephthalate.

A polyol is an organic compound containing multiple hydroxyl groups. A molecule with two or more hydroxyl groups is a polyol, e.g., with two is a diol, with three is a triol, with four is a tetrol and so on.

Preferred polyols of the invention are polyols with two or three hydroxyl groups, most preferred with three hydroxyl groups.

More preferred polyols of the invention are selected from tris(2-hydroxyethyl)isocyanurate and glycerine.

More preferred polyol as second polyol is selected from tris(2-hydroxyethyl)isocyanurate, glycerine, trimetylolpropane, pentaerythritol and mixtures thereof.

Most preferred polyol is tris(2-hydroxyethyl)isocyanurate (THEIC).

As described in S. Inoue et al (Kobunshi Ronbunshu, Vol. 54, No. 6, pages 407-411, 1997), THEIC decomposes at 130° C. in the presence of alkali metal oxide. Also U.S. Pat. No. 4,849,465 states that THEIC is not stable under the presence of ethylene glycol excess. Analogously, the melting point of other suitable polyols is for example 260° C. for pentaerythritol, 60° C. for trimethylolpropane.

A polyalkylene terephthalate, preferably polyethylene terephthalate or polybutylene terephthalate, melts at temperatures of at least 250° C.

It is therefore surprising that a transesterification reaction using polyols, which degrade or decompose at such a high temperature, would produce a polyol modified polyalkylene therepthalate. In particular, considering that the decomposition reaction of the polyols in the presence of a catalyst, as this is the case in this process, starts at even lower temperatures.

In a preferred embodiment of the invention, the amount of polyol ii) introduced in step a) of the process of the invention is at least 0.5 mol OH group per 100 g of polyalkylene terephthalate i).

More preferably, the amount of polyol ii) introduced in step a) of the process of the invention is in the range of 0.5 to 5 mol OH group per 100 g of polyalkylene terephthalate i); more preferably, in the range of 0.5 to 4 mol OH group per 100 g of polyalkylene terephthalate i); more preferably, in the range of 0.5 to 3 mol OH group per 100 g of polyalkylene terephthalate i); more preferably, in the range of 0.5 to 2 mol OH group per 100 g of polyalkylene terephthalate i).

In a preferred embodiment of the invention, the Mn molecular weight of the polyol modified polyalkylene terephthalate is in the range of 800 to 3000 Daltons.

Preferably, in the range of 800 to 2500 Daltons, more preferably, in the range of 800 to 2000 Daltons.

In the process of the invention, the molecular weight of the polyol modified polyalkylene terephthalate can be controlled adjusting the vacuum or pressure of the continuous reactor and/or the temperature. The excess of glycol, especially compared to the batch process, would cause a very low molecular weight oligomer to be produced that would not make a satisfactory wire coating.

Through this adjustment the level of ethylene glycol as a reaction product can be controlled and as a consequence the desired molecular weight of the final product can be influenced.

One of the aims of the invention is to obtain a polyol modified polyalkylene terephthalate by a continuous process having similar properties of a polyol modified polyalkylene terephthalate obtained in a batch process. The polyol modified polyalkylene terephthalate obtained by a continuous process of the invention can be used and applied, particularly on a wire enamel, in the same manner as in the batch process.

Within the meaning of the invention, a transesterification catalyst ii) introduced in step a) is an acid or a base catalyst able to catalyze a transesterification reaction of exchanging an organic group attached to an ester with the organic group attached to an alcohol.

For the scope of this invention, any catalyst suitable for a transesterification reaction can be used.

In a preferred embodiment of the process of the invention, the transesterification catalyst iii) introduced in step a) is a lewis acid.

In a preferred embodiment of the process of the invention, the lewis acid selected from titanium compounds, zinc compounds, antimony compounds, zirconium compounds, germanium compounds, ionic liquids and lead compounds.

In a most preferred embodiment of the invention, the transesterification catalyst is selected from zinc acetate and tetra-n-butyl titanate (TNBT).

In a preferred embodiment, the transesterification catalyst is present in an amount of at least 100 ppm calculated on the sum of components i), ii) and iii). Preferably the transesterification catalyst is in the range of 100 to 10000 ppm. More preferably in the range of 500 to 5000 ppm and most preferably in the range from 1000 to 3000 ppm.

In a preferred embodiment, the extruder or the continuous reactor used in the process of the invention has different temperature zones. Preferably, the extruder or the continuous reactor has a feed zone and one or more reaction zones.

A feed or feeding zone is a zone of the continuous reactor wherein the components are introduced into the reactor.

A reaction zone is a zone of the continuous reactor wherein a reaction takes place. In a continuous reactor one or more reaction zones can be present.

Preferably, the continuous reactor of the invention has one, two, three or four reaction zones.

In a preferred embodiment, all the zones may work at different temperatures.

In a further preferred embodiment, the feed zone and the reaction zones work at the same temperature.

In another preferred embodiment, the feed zone has a lower temperature than the reaction zone(s).

For the avoidance of doubt, within the meaning of the invention, any zone of the continuous reactor or of the extruder, which is not a feeding zone, is a reaction zone.

Preferably, the feed zone of the reactor has a temperature in the range of 100° C. to 300° C., preferably in the range of 100° C. to 200° C., more preferably, the feed zone of the reactor has a temperature in the range of 100° C. to 150° C.

Preferably, the temperature of each of the reaction zone of the reactor can be the same or different and it is in the range of 200° C. to 350° C., more preferably, in the range of 250° C. to 350° C., more preferably in the range of 250° C. to 320° C., more preferably, in the range of 270° C. to 350° C., most preferably in the range of 270° C. to 320° C.

In another embodiment, each of the reaction zone works at the same temperature.

In another embodiment, each of the reaction zone works at two, three or four different temperatures.

In another preferred embodiment of the process of the invention, each temperature zone of the extruder works at a different temperature.

In a preferred embodiment of the invention, components i) a polyalkylene terephthalate, ii) a polyol and iii) a transesterification catalyst are introduced in the reactor in step a) through the feeding zone.

Optionally, additives or a low amount of one or more solvents, preferably one solvent, is introduced in the reactor through the feeding zone.

In another embodiment, the process of the invention further comprises the step c) of removing the polyol modified polyalkylene terephthalate from the reactor.

In another embodiment, the process of the invention further comprises the step c) of removing the polyol modified polyalkylene terephthalate from the reactor and step d) of dissolving the polyol modified polyalkylene terephthalate in a solvent producing a dissolved polyol modified polyalkylene terephthalate.

In another embodiment, the process of the invention further comprises the step e) of applying the dissolved polyol modified polyalkylene terephthalate on a wire, optionally in the presence of one or more further components selected from additives and diluents and optionally in the presence of one or more solvents, preferably one solvent.

In another embodiment, the invention relates to a process for dissolving the polyol modified polyalkylene terephthalate obtained by the process of the invention for producing polyol modified polyalkylene terephthalate, wherein the process of the invention is followed by step d) of dissolving the polyol modified polyalkylene terephthalate in a solvent producing a dissolved polyol modified polylakylene terephthalate. Optionally in step d) one or more further components selected from additives and diluents are added to the dissolved polyol modified polyalkylene terephthalate.

In another embodiment the invention relates to a process for applying on a wire a dissolved polyol modified polyalkylene terephthalate obtained by the process for dissolving the polyol modified polyakylene terephthalate obtained by the process of the invention for producing polyol modified polyalkylene terephthalate, wherein the process for dissolving the polyol modified polyakylene terephthalate, is followed by the step of applying the dissolved polyol modified poylakylene terephthalate on a wire. Optionally, one or more further components selected from additives and diluents are added to the dissolved polyol modified polyalkylene terephthalate.

Within the meaning of the invention, solvents used in the melt of the polyalkenylene terephthalate are solvents able to dissolve the polyalkenylene terephthalate and preferably they are suitable for wire enamels applications.

Preferred solvents are cresylic or phenolic solvents. Preferably cresylic acid, phenol or mixtures thereof.

In a preferred embodiment of the process of the invention, the dissolved polyol modified polyalkylelene terephthalate further comprises additives.

In a preferred embodiment of the process of the invention, one or more components selected from additives are introduced in the reactor in step a).

In another preferred embodiment of the process of the invention, a low amount of one or more solvents, preferably one, is introduced in the reactor in step a).

In a preferred embodiment of the process of the invention, the additives are selected from phenolic resins, blocked isocyanate, tetra-n-butyl titanate (TNBT), diluents and flow additives.

Flow additive are materials such as silicone fluid which improves the coating surface.

Diluents are for example Solvent 100, xylene and other solvents, which are introduced to reduce the viscosity of the polymers of the invention.

In a most preferred embodiment, the invention relates to a continuous process for producing tris(2-hydroxyethyl) isocyanurate modified polyethylene terephthalate, comprising the steps of
  (a) introducing in an extruder comprising a reaction zone
    i) polyethylene terephthalate, ii) tris(2-hydroxyethyl) isocyanurate, iii) a transesterification catalyst selected from zinc acetate or tetra-n-butyl titanate and one or more optional components;
  (b) reacting the introduced components in the reaction zone of the extruder at a temperature in the range of 250° C. to 350° C. to produce a tris(2-hydroxyethyl) isocyanurate modified polyethylene terephthalate;
wherein step b) is performed a melt of the polyethylene terephthalate preferably substantially free of solvent, more preferably in the absence of a solvent.

The present invention is explained in more details by the following examples.

List of Abbreviations

PET polyethylentherephtalate
PBT polybutyleneterephthalate
THEIC tris(2-hydroxyethyl)isocyanurate
RPM revolutions per minute
TNBT tetra-n-butyl titanate
GPC gel permeation chromatography
TMP trimethylolpropane
THF tetrahydrofuran
$M_n$ number average molecular weight
$M_w$ weight average molecular weight

EXAMPLES

All experiments were performed using a Brabender Co-Rotating Clamshell Twin Screw Extruder Model 20/40D. The extruder contained 4 heating zones, a die adapter heating zone and a die heating zone. If not otherwise specified, the first heating zone is the feeding zone and the remaining zones are reaction zones. The screw design contained forward and reverse conveying elements, forward and reverse kneading blocks, and teeth elements. Polyethylene terephthalate (PET) (SKC Films Inc.) was fed through a single spiral screw volumetric feeder. Tris (2-hydroxyethyl) isocyanurate (THEIC) as well as cyanuric acid were fed through either a twin concave screw volumetric feeder or a single auger screw volumetric feeder. Either zinc acetate or tetra-n-butyl titanate (TNBT) were used as catalysts and premixed with the THEIC or PET. When the amount of a catalyst is given in weight %, such amount is calculated based on the total weight of the components. All materials were dosed through a 3 L stainless steel hopper. No additional equipment was used unless otherwise specified.

Example 1 (Comparative)

PET was fed with all temperature zones set to 270° C. The PET feed rate was 15 g/min and the extruder screw speed was set at 100 RPM. The PET exited the extruder as a meltand was collected into cans and cooled. The resulting product was solid at room temperature and insoluble in THF. Sample could not be measured by GPC in tetrahydrofuran (THF). Probably, the molecular weight of the resulting polymer is too high and therefore it could not be solved in THF.

Example 2 (Comparative)

PET and THEIC were fed with no catalyst and with all zones set to 270° C. The rates of feed of the PET and THEIC were 15 g/min and 12 g/min respectively. The extruder screw speed was set at 100 RPM. The resulting plastic exited the extruder as a melt and was collected into cans and cooled. The resulting product was solid at room temperature and mostly insoluble in THF. Decomposition was observed by darkening of the material. Sample could not be measured by GPC in THF.

Example 3

PET and THEIC/Zinc acetate catalyst premix were fed with all zones set to 270° C. The catalyst loading was 0.43% by weight. The rates of feed of the PET and THEIC premix were 15 g/min and 12 g/min respectively, corresponding to 0.92 mol OH per 100 g PET. The extruder screw speed was set at 100 RPM. The resulting polyol modified PET exited the extruder as a melt and was collected into cans and cooled. The clear product was soluble in THF and further characterized by GPC. The number and weight average molecular weight is comparable to batch produced THEIC polyester polymer used in wire enamel coatings. Infrared spectrum is consistent with THEIC polyester polymer produced by the conventional batch process. $^1$H and $^{13}$C NMR are also consistent with material produced by batch process.

Example 4

PET and THEIC/Zinc acetate catalyst premix were fed with all zones set to 300° C. The catalyst loading was 0.43% by weight. The rates of feed of the PET and THEIC premix were 15 g/min and 12 g/min respectively, corresponding to 0.92 mol OH per 100 g PET. The extruder screw speed was set at 100 RPM. The resulting polyol modified PET exited the extruder as a melt and was collected into cans and cooled. The clear product was soluble in THF and further characterized by GPC. The number and weight average molecular weight is comparable to batch produced THEIC polyester polymer used in wire enamel coatings. Infrared spectrum is consistent with THEIC polyester polymer produced by the conventional batch process. $^1$H and $^{13}$C NMR are also consistent with material produced by batch process.

Example 5

PET and THEIC/Zinc acetate catalyst premix were fed with all zones set to 270° C. The catalyst loading was 0.86% by weight. The rates of feed of the PET and THEIC premix were 15 g/min and 12 g/min respectively, corresponding to 0.92 mol OH per 100 g PET. The extruder screw speed was set at 100 RPM. The resulting polyol modified PET exited the extruder as a melt and was collected into cans and cooled. The clear product was soluble in THF and further characterized by GPC. The number and weight average molecular weight is comparable to batch produced THEIC polyester polymer used in wire enamel coatings. Infrared spectrum is consistent with THEIC polyester polymer produced by the conventional batch process. $^1$H and $^{13}$C NMR are also consistent with material produced by batch process.

Example 6 (Batch Process)

Terephthalic acid (190 g), THEIC (170 g), ethylene glycol (52 g) and tetrabutyltitanate catalyst (0.4 g) were added to flask with mechanical stirring, nitrogen purge and heating mantel. Cresylic acid solvent (30 g) was added. The components were heated to a temperature of 220° C. with removal of water to form a clear plastic resin after 12 hours. The clear product was soluble in THF and further characterized by GPC. Infrared spectrum, $^1$H and $^{13}$C NMR were taken after removal of the cresylic acid solvent.

From examples 1-6 it is apparent that with use of a continuous reactor or extruder one can produce a THEIC polyester that is comparable to the batch process. It is also critical that PET, polyol and catalyst be present for the reaction to take place in a reasonable amount of time. Higher loading levels of catalyst also increase the rate of reaction.

| Example | $M_n$ (g mol$^{-1}$) | $M_w$ (g mol$^{-1}$) |
| --- | --- | --- |
| 1 (comparative) | Not soluble | Not soluble |
| 2 (comparative) | Not soluble | Not soluble |
| 3 | 1129 | 2235 |
| 4 | 1752 | 7363 |
| 5 | 1230 | 2737 |
| 6 (batch) | 1391 | 4451 |

Example 9

PET and THEIC/Zinc acetate catalyst premix were fed with the feed zone set at 100° C., second zone set to 270° C., and the remaining two zones set to 315° C. respectively. The catalyst loading was 0.86% by weight. The rates of feed of the PET and THEIC premix were 47 g/min and 36 g/min respectively, corresponding to 0.87 mol OH per 100 g PET. The extruder screw speed was set at 250 RPM. The resulting polyol modified PET exited the extruder as a melt and was collected into cans and cooled. The residence time through the extruder was 45 seconds. The clear product was soluble in THF and further characterized by GPC. Infrared spectrum is consistent with THEIC polyester polymer produced by the conventional batch process. $^1$H and $^{13}$C NMR are also consistent with material produced by batch process.

Example 10

PET and THEIC/Zinc acetate catalyst premix were fed with the feed zone set at 100° C., second zone set to 270° C., and the remaining two zones set to 325° C. respectively. The catalyst loading was 0.86% by weight. The rates of feed of the PET and THEIC premix were 47 g/min and 36 g/min respectively, corresponding to 0.87 mol OH per 100 g PET. The extruder screw speed was set at 250 RPM. The resulting polyol modified PET exited the extruder as a melt and was collected into cans and cooled. The residence time through the extruder was 45 seconds. The clear product was soluble in THF and further characterized by GPC. Infrared spectrum is consistent with THEIC polyester polymer produced by the conventional batch process. $^1$H and $^{13}$C NMR are also consistent with material produced by batch process.

Examples 9 and 10 demonstrate that elevated temperatures of greater than 300° C. can be successfully used to produce modified polyester resin comparable to the batch process.

| Example | $M_n$ (g mol$^{-1}$) | $M_w$ (g mol$^{-1}$) |
| --- | --- | --- |
| 9 | 1346 | 3306 |
| 10 | 1452 | 4542 |

Examples 15 and 17

PET and THEIC/TNBT catalyst premix were fed with the feed zone set at 120° C., and the remaining zones set to 285° C. or 300° C. respectively. The catalyst loading was 0.20% by weight. The rates of feed of the PET and THEIC premix were 21 g/min and 15 g/min respectively, corresponding to 0.81 mol OH per 100 g PET. The extruder screw speed was set at 250 RPM. The resulting polyol modified PET exited the extruder as a melt and was collected into cans and cooled. The residence time through the extruder was 130 seconds. The clear product was soluble in THF and further characterized by GPC. Infrared spectrum is consistent with THEIC polyester polymer produced by the conventional batch process. $^1$H and $^{13}$C NMR are also consistent with material produced by batch process.

Examples 15 and 17 demonstrate that alternate lewis acid catalysts can be used to produce a THEIC polyester with comparable properties to the batch process.

| Example | $M_n$ (g mol$^{-1}$) | $M_w$ (g mol$^{-1}$) |
| --- | --- | --- |
| 15 | 1471 | 3854 |
| 17 | 1667 | 5301 |

Examples 23, 25 and 26

PET and THEIC/TNBT catalyst premix were fed with the feed zone set at 130° C. and the remaining zones set to 290° C., 310° C., or 320° C., respectively. The catalyst loading was 0.20% by weight. The rates of feed of the PET and THEIC premix were 58 g/min and 42 g/min respectively, corresponding to 0.83 mol OH per 100 g PET. The extruder screw speed was set at 350 RPM. The resulting polyol modified PET exited the extruder as a melt and was collected into cans and cooled.

Examples 23-26 show that temperature can be used to control the molecular weight of the resulting THEIC polyester resin. Higher temperatures gave material with higher molecular weight.

| Example | $M_n$ (g mol$^{-1}$) | $M_w$ (g mol$^{-1}$) |
|---|---|---|
| 23 | 1433 | 3551 |
| 25 | 1583 | 4584 |
| 26 | 1669 | 5651 |

Examples 31-32

PET and a trimethylolpropane (TMP)/TNBT catalyst premix were fed with the feed zone set at 100° C. and the remaining zones set to 310° C. or 320° C. The catalyst loading was 0.20% by weight. The rates of feed of the PET and TMP premix were 29 g/min and 22 g/min respectively, corresponding to 1.67 mol OH per 100 g PET. The extruder screw speed was set at 250 RPM. The resulting polyol modified PET exited the extruder as a melt and was collected into cans and cooled in ambient conditions.

Example 36

PET and a glycerin/TNBT catalyst premix were fed with the feed zone set at 100° C. and the remaining zones set to 320° C. The catalyst loading was 0.20% by weight. The rates of feed of the PET and glycerin premix were 30 g/min and 10 g/min respectively, corresponding to 1.1 mol OH per 100 g PET. This system contained excess glycerin. The extruder screw speed was set at 250 RPM. The resulting polyol modified PET exited the extruder as a melt and was collected into cans and cooled.

Examples 31, 32 and 36 demonstrate that alternate polyols can be used in addition to THEIC to produce a modified polyester.

| Example | $M_n$ (g mol$^{-1}$) | $M_w$ (g mol$^{-1}$) |
|---|---|---|
| 31 | 862 | 1406 |
| 32 | 1076 | 1966 |
| 36 | 1449 | 3032 |

Examples 38-39

Polybutylene terephthalate (PBT) and a THEIC/TNBT catalyst premix were fed with the feed zone set at 100° C. and the remaining zones set to 300° C., or 320° C. The catalyst loading was 0.20% by weight. The rates of feed of the PBT and THEIC premix were 20 g/min and 13 g/min respectively, corresponding to 0.75 mol OH per 100 g PET. The extruder screw speed was set at 250 RPM. The resulting polyol modified PET exited the extruder as a melt and was collected into cans and cooled. The clear product was soluble in THF and further characterized by GPC. The number and weight average molecular weight is comparable to batch produced THEIC polyester polymer used in wire enamel coatings. The infrared spectrum is consistent with THEIC polyester.

| Example | $M_n$ (g mol$^{-1}$) | $M_w$ (g mol$^{-1}$) |
|---|---|---|
| 38 | 1403 | 3462 |
| 39 | 1977 | 7465 |

Magnet Wire Coatings: The resin from example 17 and control sample 6 were used as the polymers for a magnet wire coating.

Example 40

Resin from control Example 6 (300 g) was dissolved in 100 g of cresylic acid and 300 g of phenol. Solvent 100 (225 g) diluent was then added. Phenolic 877-R-50 (35 g) was then added along with Desmodur CT stable (25 g). Tetrabutyltitanate (16 g) crosslinker was finally added. The mixture was enameled on 1.0 mm copper wire monolithically and as base coat with a standard Polyamideimide top coat (75:25 thickness) using a conventional magnet wire oven (MAG).

Example 41

Resin from control Example 17 (300 g) was dissolved in 100 g of cresylic acid and 300 g of phenol. Solvent 100 (225 g) diluent was then added. Phenolic 877-R-50 (35 g) was then added along with Desmodur CT stable (25 g). Tetrabutyltitanate (16 g) crosslinker was finally added. The mixture was enameled on 1.0 mm copper wire monolithically and as base coat with a standard Polyamideimide top coat (75:25 thickness) using a conventional magnet wire oven (MAG). The resin solutions were checked for viscosity and found to be equivalent at roughly 500 cP at 25° C. Each coating was then applied to a steel panel by a knife coater and cured in an oven at 260° C. for 30 minutes. A sample of the panel was then analyzed by TMA for glass transition (Tg). Examples 40 and 41 were found to have equivalent glass transition points.

| Sample | μ [cP] | Tg [° C.] |
|---|---|---|
| Example 40 | 500 | 164 |
| Example 41 | 474 | 162 |

Mechanical Properties on wire are shown in the tables below. The batch process enamel (Example 40) was comparable in properties to the material synthesized by the continuous process (Example 41).

Mandrel Test 1×Diameter with Pre-Stretching %

| % | Example 40/PAI Top coat (control) | Example 40 (control) | Example 41/PAI Top coat | Example 41 |
|---|---|---|---|---|
| 0 | 3/3 | 3/3 | 3/3 | 3/3 |
| 5 | 3/3 | 3/3 | 3/3 | 3/3 |
| 10 | 3/3 | 3/3 | 3/3 | 3/3 |
| 15 | 3/3 | 3/3 | 3/3 | 3/3 |
| 20 | 3/3 | 3/3 | 3/3 | 3/3 |
| 25 | 3/3 | 3/3 | 3/3 | 3/3 |
| 30 | 3/3 | 3/3 | 3/3 | 3/3 |

Peel Test

| | Example 40/PAI Top coat (control) | Example 40 (control) | Example 41/PAI Top coat | Example 41 |
|---|---|---|---|---|
| Twists | 184 | 134 | 194 | 140 |

Tan Delta

|  | Example 40/PAI Top coat (control) | Example 40 (control) | Example 41/PAI Top coat | Example 41 |
|---|---|---|---|---|
| ° C. | 166.6 | 166.3 | 162.9 | 167.2 |

Cut-Through Large Plate

|  | Example 40/PAI Top coat (control) | Example 40 (control) | Example 41/PAI Top coat | Example 41 |
|---|---|---|---|---|
| ° C. | 420 | 430 | 410 | 420 |

Measurements

GPC measurement were performed using Agilent Infinity 1260 GPC. The Infinity GPC is equipped with an Infinity 1260 Degasser. The Infinity GPC is equipped with an isocratic pump that is also model number Infinity 1260. The serial number is DEAB902598. Next the Infinity GPC contains attachments for thermostating the GPC columns and autosampler features. The solvent is tetrahydrofuran (THF) and supplied by Honeywell. The purity is 99.9% with a peroxide level of less than 2 mg/L. Samples to be analyzed are first dissolved in THF with mild agitation. The sample is then filtered through a 5 mL syringe with a 0.5 micron filter filter housing. The solution is collected with a 5 mL vial suitable for the autosampler. A lid with a rubber septum is then crimped onto the vial using an Agilent supplied vial crimper. After all the samples have been loaded into the autosampler, the method is started. The method is set to a flow rate of 1 mL/min of THF through a mixed D column (2 in series) supplied by Phenomenex. The mixed D columns are thermostated at 40° C. and the refractive index detector is baseline zeroed. The effluent is collected in a suitable container with proper venting. Samples are injected on the column per the method with an injection volume of 0.5 microliters per injection. The refractive index detector is thermostated at 40° C. also to prevent signal drift. The signal polarity is positive. The maximum pressure allowed on the column set is 600 bar. Analysis was performed with Agilent Chemstation software. Reference samples of polystyrene purchased from Agilent are run in a similar fashion to develop a calibration curve. The standards range in molecular weight of 500 to 30,000 Daltons. The calibration curve can be a linear fit or first order or second order depending on the column set utilized. In this experiment we used a first order fit.

Flexibility or Mandrel Test was performed according to the procedure IEC EN 60851-3. Therein it is described the Mandrel winding test. Coated wires were taken as such and pre-stretched at 5%, 10%, 15%, 20%, 25%, 30%. For each measurement point three probes were prepared. Each wire was wound around a polished mandrel, a piece of steel having the same diameter as the wire. Once the wire was on the mandrel, the presence of cracks was checked. The absence of cracks gives the flexibility of the coated wire.

Peel Test was performed according to the procedure IEC EN 60851-3. Therein it is described the peel test applicable to enameled round wire with a nominal conductor diameter over 1000 mm.

Tan delta was measured using Dansk tangent delta instrument.

Cut Through Large Plate was measured using Nova 1005 Thermoplastic Cut-Through Tester that meets the NEMA-MW1000 and the JIS C3003 specifications.

1H and 13C NMR spectra were measured using 500 MHz Varian NMR in CDCl3.

FT-IR was measured using Thermoscientific Nicolet FT-IR using ATR attachment. Viscosity was measured using Brookfield LV viscometer.

Tg was measured using TA Instruments Thermomechanical Analyzer using a penetration probe. The heating rate was 10° C. per minute.

The invention claimed is:

1. A continuous process for producing a polyol modified polyalkylene terephthalate, the continuous process comprising:
   introducing components in a continuous reactor comprising a reaction zone, the components including a polyalkylene terephthalate, a polyol, and a transesterification catalyst;
   reacting the components in the reaction zone of the reactor at a temperature in the range of 180° C. to 350° C. to produce a polyol modified polyalkylene terephthalate;
   wherein the polyol includes one or more of tris(2-hydroxyethyl)isocyanurate and glycerine, and
   wherein reacting the components is performed in a melt of the polyalkylene terephthalate.

2. The continuous process of claim 1, wherein the continuous process is performed in an extruder.

3. The continuous process of claim 1, wherein the melt of the polyalkylene terephthalate is substantially without a solvent.

4. The continuous process of claim 1, wherein reacting the components is performed in the absence of a solvent.

5. The continuous process of claim 1, wherein the polyalkylene terephthalate is polyethylene terephthalate or polybutylene terephthalate.

6. The continuous process of claim 1, wherein the amount of the polyol introduced in the continuous reactor includes at least 0.5 mol OH groups per 100 g of the polyalkylene terephthalate.

7. The continuous process of claim 1, wherein the Mn (number average) molecular weight of the polyol modified polyalkylene terephthalate is in the range of 800 to 3000 Daltons.

8. The continuous process of claim 1, wherein the amount of the transesterification catalyst introduced is in the range of 100 to 10000 ppm calculated on the sum of the polyalkylene terephthalate, the polyol, and the transesterification catalyst components.

9. The continuous process of claim 1, wherein the transesterification catalyst is a lewis acid.

10. The continuous process of claim 1, wherein the polyol further comprises one or more of trimetylolpropane and pentaerythritol.

11. The continuous process of claim 1, wherein the polyol is tris(2-hydroxyethyl)isocyanurate or glycerine.

12. The continuous process of claim 1, wherein the continuous process further comprises removing the polyol modified polyalkylene terephthalate from the reactor.

13. The continuous process of claim 1, further comprising dissolving the polyol modified polyalkylene terephthalate in a solvent to produce a dissolved polyol modified polyalkylene terephthalate.

14. The continuous process of claim 13, further comprising adding one or more of an additive and a diluent to the dissolved polyol modified polyalkylene terephthalate.

15. The continuous process of claim 1, further comprising applying the polyol modified polyalkylene terephthalate on a wire.

16. The continuous process of claim 15, further comprising adding one or more of an additive and a diluent to the dissolved polyol modified polyalkylene terephthalate.

\* \* \* \* \*